Feb. 18, 1947. O. S. McGUFFEY 2,416,015
METHOD OF MAKING HOLD-OVER REFRIGERATION PLATES
Filed Feb. 6, 1943 2 Sheets-Sheet 1
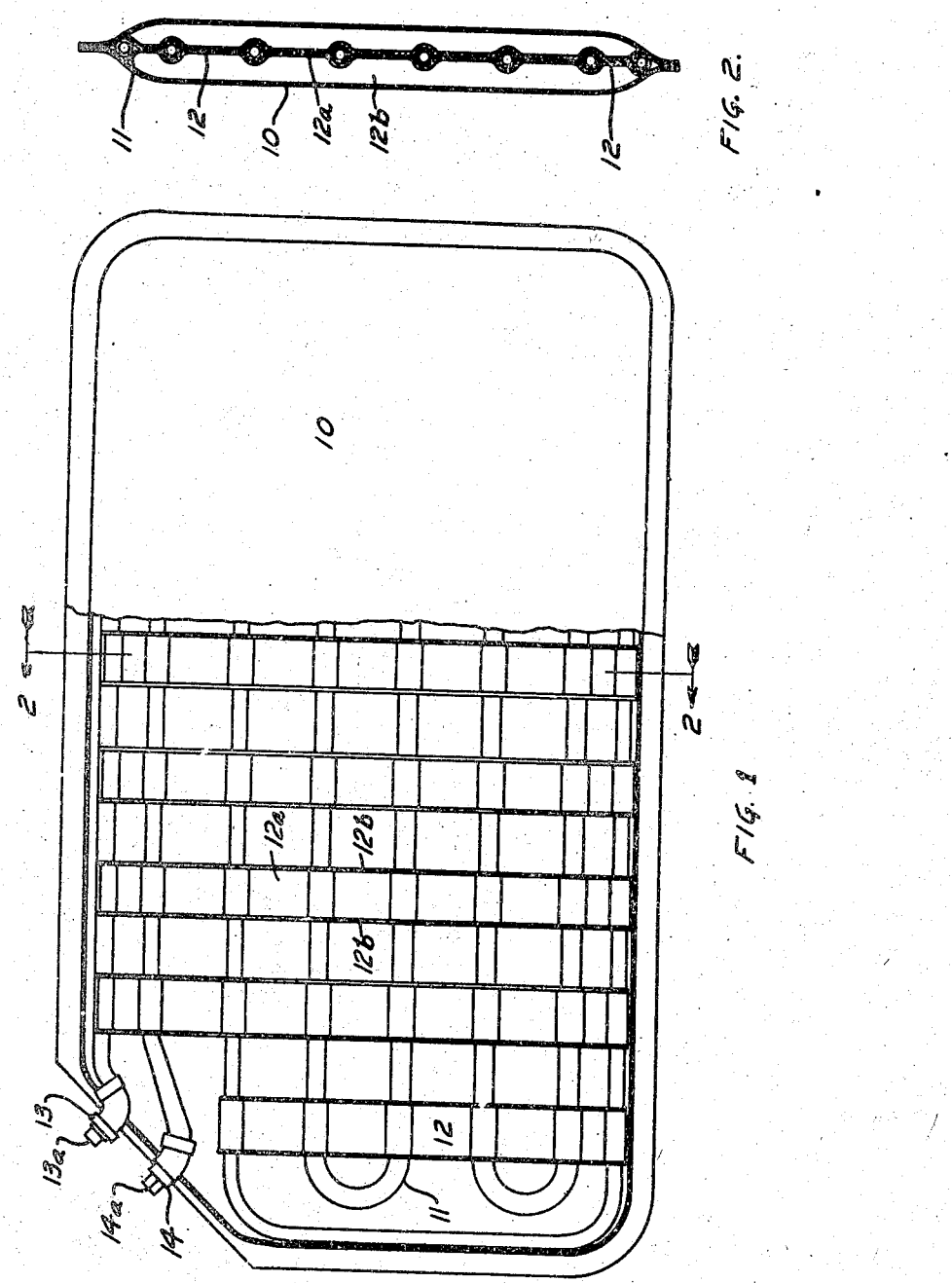
INVENTOR.
ORTON S. McGUFFEY
BY
Carroll R. Taber Feb. 18, 1947.  O. S. McGUFFEY  2,416,015
METHOD OF MAKING HOLD-OVER REFRIGERATION PLATES
Filed Feb. 6, 1943  2 Sheets-Sheet 2
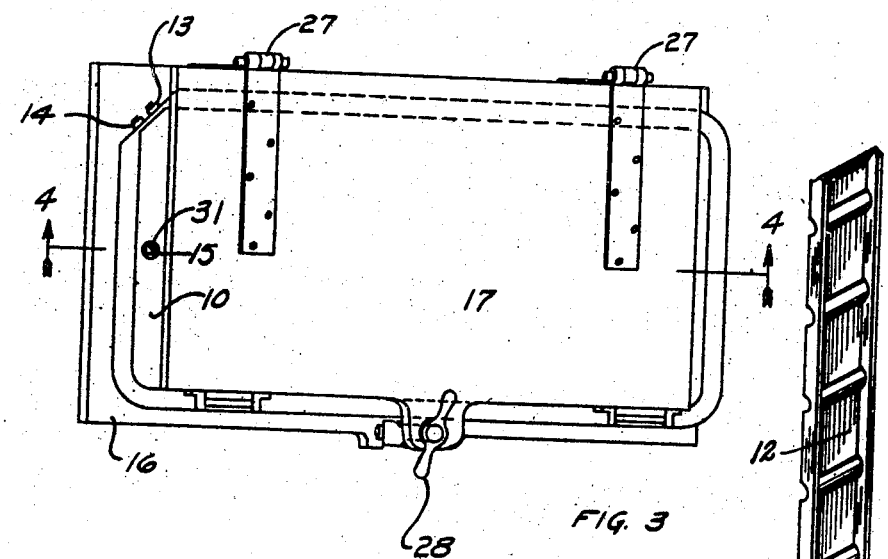
FIG. 3
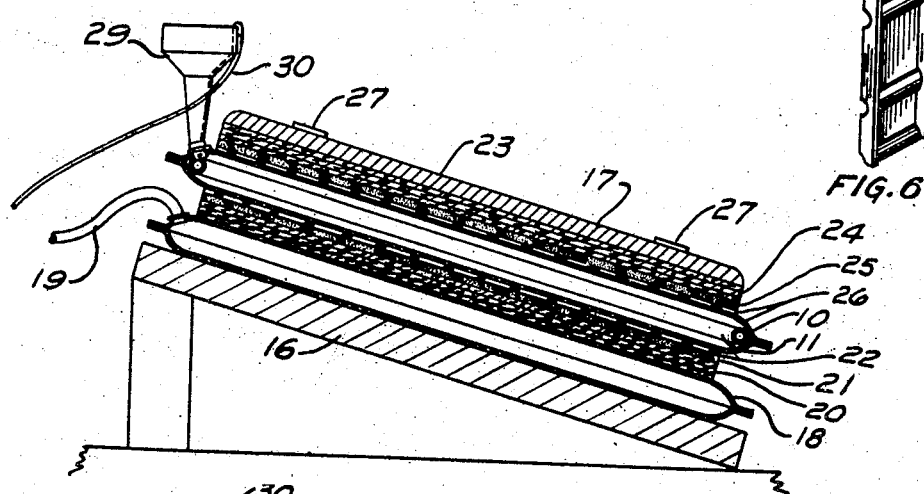
FIG. 6
FIG. 4
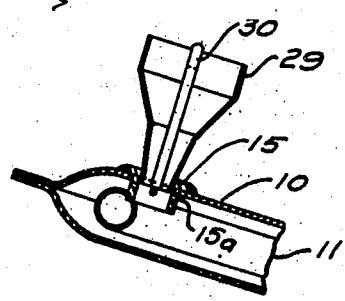
FIG. 5
INVENTOR.
ORTON S. McGUFFEY
BY
Carroll R. Taber Patented Feb. 18, 1947

2,416,015

UNITED STATES PATENT OFFICE 2,416,015

METHOD OF MAKING HOLDOVER REFRIGERATION PLATES

Orton S. McGuffey, Lansing, Mich., assignor to Kold-Hold Manufacturing Company, Lansing, Mich., a corporation of Michigan Application February 6, 1943, Serial No. 474,949

5 Claims. (Cl. 62—170)

This invention relates to hold-over refrigeration plates and more particularly to a novel construction and method of making such plates.

Hold-over refrigeration plates conventionally comprise a sealed tank containing a refrigerant evaporator coil and being partially filled with a liquid hold-over solution. The evaporator coil is adapted to be connected to a refrigerant condensing unit for a period long enough to freeze or congeal the hold-over solution. The evaporator is then disconnected from the condensing unit and the hold-over solution itself produces a refrigerating effect.

One of the problems which is encountered in the use of such plates is the rupturing of the tank when the hold-over solution freezes and expands. This problem has been partially overcome in the past by filling the tank only partially full of liquid and then exhausting the air in the remainder of the tank to create a vacuum space into which the hold-over solution can expand when it freezes. This results in a "slopping around" of the solution when it is in the liquid state and an unequal distribution of the refrigerating effect throughout the surface of the plate.

All of the foregoing disadvantages are overcome by the present invention which provides a tank which is, in effect, completely filled with the hold-over solution in its liquid state and which nevertheless is capable of sufficient expansion to accommodate the frozen solution without rupturing the tank.

This novel result is obtained by filling the tank completely full of liquid solution which tends to bulge the sides outwardly, then pressing the sides inwardly to expel a portion of the liquid and any trapped air, next sealing the tank while pressure is still being exerted against the side walls, and finally releasing the pressure from the side walls.

This method apparently produces a condition where the pressure within the tank is less than the pressure of the atmosphere and the latter holds the side walls of the tank in the predetermined position which they occupied during the sealing operation. When the hold-over solution freezes, and thereby expands, the side walls of the tank are caused to bulge out from their normal condition to some extent. But when the hold-over solution melts and returns to the liquid state, the tank contracts again. Thus, the tank is in effect completely filled with hold-over solution at all times.

For a more complete understanding of the invention, its objects and advantages, reference should now be had to the accompanying drawings, wherein—

Figure 1 is a side view, partly in section of a refrigeration plate embodying the present invention;

Figure 2 is a sectional view taken on substantially the line 2—2 of Figure 1;

Figure 3 is a top plan view of the plate and the means employed for pressing the sides of the tank inwardly before sealing;

Figure 4 is a sectional view taken on the line 4—4 of Figure 3 illustrating how the tank is filled;

Figure 5 is an enlarged fragmentary view of the structure shown in Figure 4; and Figure 6 is a pictorial view of one of the fins for spacing the evaporator coil and the walls of the tank.

As shown in Figures 1 and 2, the refrigeration plate comprises a tank 10 consisting of two complementary pan like sheet metal stampings welded to each other about their peripheries. Within the tank there is disposed a refrigerant evaporator coil 11 having associated therewith a plurality of fins 12 which serve as heat transfer means and also as spacers interposed between the opposite side walls of the tank. The fins 12 are of U-shape in cross-section, comprising web portions 12a and flanges 12b. The fins are arranged in pairs on opposite sides of the evaporator coil with the web portion of each fin formed to partially surround the coil.

The evaporator coil is provided with suitable inlet and outlet connections 13 and 14 exteriorly of the tank. Suitable plugs 13a and 14a are provided for closing these connections; and a fluid tight joint is formed where the ends of the coil pass through the wall of the tank 10.

The tank is provided with a filler opening in one side wall thereof, the details of which are shown in Figure 5. As there shown, the filler opening includes an internally threaded spud 15 which is welded to the tank to form a fluid tight connection therewith and extends a substantial distance into the tank. The spud 15 is provided with a plurality of small openings 15a just inside of the wall of the tank 10 which serve as bleeder openings for air and liquid hold-over solution, as will appear more fully hereinafter.

It will be understood from the foregoing that the evaporator coil 11 and fins 12 are assembled together and the tank 10 is then formed around them by welding the adjacent edges of the sheet metal stampings together. The spud 15 and the connections 13 and 14 are preferably installed on the appropriate sheet metal blank before the tank is formed.

After the tank has been formed, it is placed upon the support shown in Figures 3 and 4 for filling, compressing and sealing. This structure comprises a base or immovable lower supporting member 16 and an upper and movable clamping member 17 having one edge hingedly connected to the support 16 and with its opposite edge formed to be detachably clamped to the support 16. The members 16 and 17 are of a size to substantially enclose the tank 10 when it is positioned therebetween.

The base 16 provides an inclined support. Mounted upon the support is a tank 18 which is identical to tank 10 but does not have anything inside of it. An air hose 19 is connected to the filler opening of tank 18 so that when air is forced into the tank it serves as a pressure bellows. Mounted on top of tank 18 is an assembly comprising a sheet of plywood 20, a sheet of sponge rubber 21, and a sheet of relatively hard and firm rubber 22.

The tank 10 is placed upon the sheet of rubber 22 with the spud 15 constituting the filler opening located at the upper end of the inclined support.

The movable support member 17 comprises a sheet of metal 23 having secured to the under surface thereof, in the order named, a sheet of plywood 24, a sheet of sponge rubber 25, and a sheet of hard rubber 26. Thus, when the parts are in the position shown in Figure 4, the tank 10 is located between the sheets of hard rubber 22 and 26.

As previously mentioned, one edge of the movable support member 17 is connected to one edge of the stationary support member 16 by hinges 27. A clamp 28 is adapted to detachably connect the other edges of the two support members together. It will be understood that the movable member can be swung to an upright position to permit the installation or removal of the tank 10.

In practice, a tank 10 is placed in the support as shown in Figure 4 and the movable member 17 clamped to the stationary member 16 before any pressure is applied to bellows 18 and before any liquid hold over solution is introduced into tank 10. As soon as that has been done, liquid hold-over solution is introduced into tank 10 through the spud 15 by means of a special funnel 29.

As the tank fills up with liquid the side walls tend to bulge outwardly against the rubber cushions. When it is completely filled, air is forced into bellows 18 under sufficient pressure to cause the side walls of tank 10 to press snugly against the fins 12. This forces a part of the liquid hold-over solution out of the tank and an overflow pipe 30 is associated with the funnel 29 to carry it away.

Overflow pipe 30 has one end attached to the inside of funnel 29 and terminates at the same level as bleeder openings 15a formed in the spud 15. Thus, the liquid which is forced out of the tank 10 by the bellows 18 passes through openings 15a and is drained away through siphoning action by overflow pipe 30, leaving the tank still in effect completely filled with liquid. While the tank is still in that condition and under the influence of the expanded bellows 18, the funnel 29 is removed from the spud 15 and a plug 31 is threaded into the spud 15 so as to completely fill the space within the spud which is not occupied by liquid hold-over.

The plug 31 seals the filler opening and the entire tank 10 is then hermetically sealed. After that has been done, the pressure is withdrawn from bellows 18, the movable member 17 is swung to an upright position, and the tank 10 is removed from the support ready for use as a hold-over refrigeration plate. The support is then ready to receive another tank 10.

When the tank 10 has been completed as above described, the side walls thereof will remain in contact with the fins 12 throughout their entire areas so long as the hold-over solution remains in a liquid state. When the solution is frozen and expands, the side walls of tank 10 bulge away from the fins 12 and accommodate themselves to the enlarged volume of the hold-over solution without rupturing. As shown, in order to obtain this advantageous result it is essential that the side walls of the tank be of relatively large area. In order to prevent localization of the bulging at the edges of the tank which might result in rupturing the tank, it is desirable to utilize the arrangement described in my recently issued Patent No. 2,287,941 issued June 30, 1942.

The scope of the invention is indicated in the appended claims.

I claim:

1. The method of making hold-over refrigeration plates which comprises providing a tank having opposed side walls of relatively large area and having a filler opening adjacent one edge thereof, said tank containing relatively rigid spacer means interposed between the side walls, positioning said tank with the filler opening located above the remainder of the tank, introducing liquid into the tank through said filler opening until the tank is completely filled, applying external pressure against the side walls of the tank to press the side walls into engagement with the spacer means, sealing the tank from the atmosphere while the tank is under the influence of said external pressure, and thereafter releasing the pressure from the side walls.

2. The method defined in claim 1 wherein the external pressure applied to the side walls is distributed substantially uniformly over the side walls of the tank.

3. The method defined in claim 1 wherein the external pressure is applied to the side walls of the tank through a yieldable medium to distribute the pressure uniformly.

4. The method defined in claim 1 wherein the external pressure is applied to the side walls by supporting one side of the tank on a relatively immovable support and engaging the other side of the tank by a relatively movable clamp and then pressing the movable clamp toward the immovable support.

5. The method of making hold over refrigeration plates which comprises providing a tank having therein a refrigerant evaporator coil, said tank having opposed flexible side walls of relatively large area and having a filler opening adjacent one edge thereof, positioning said tank with the filler opening located above the remainder of the tank, introducing liquid into the tank through said filler opening until the tank is completely filled, applying external pressure against the side walls of the tank to decrease the volume of the tank and expel some liquid therefrom, thereafter sealing the tank from the atmosphere while the tank is under the influence of said external pressure, and finally releasing the pressure from said side walls.

ORTON S. McGUFFEY.

REFERENCES CITED

The following references are of record in the file of this patent:

UNITED STATES PATENTS

| Number | Name | Date |
|---|---|---|
| 2,241,411 | McGuffey | May 13, 1941 |
| 2,287,941 | McGuffey | June 30, 1942 |
| 2,172,311 | Thomas | Sept. 5, 1939 |
| 2,063,646 | Whitesel | Dec. 8, 1936 |
| 1,880,969 | Muffly | Oct. 4, 1942 |
| 2,177,919 | Vogt | Oct. 21, 1939 |
| 2,016,377 | Krotzer | Oct. 8, 1935 |
| 1,979,617 | Heideman | Nov. 6, 1934 |